(12) United States Patent
Gurunathan et al.

(10) Patent No.: US 8,232,676 B2
(45) Date of Patent: Jul. 31, 2012

(54) UNINTERRUPTIBLE FUEL CELL SYSTEM

(75) Inventors: Ranganathan Gurunathan, Chennai (IN); Ramesh Srinivasan, Chennai (IN); Arne Watson Ballantine, Palo Alto, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 5 days.

(21) Appl. No.: 12/149,488

(22) Filed: May 2, 2008

(65) Prior Publication Data

US 2009/0273240 A1    Nov. 5, 2009

(51) Int. Cl.
*H02J 7/00*     (2006.01)
*H02J 9/00*     (2006.01)
(52) U.S. Cl. ......................................................... 307/66
(58) Field of Classification Search .................... 307/66
See application file for complete search history.

(56) References Cited

U.S. PATENT DOCUMENTS

| | | | |
|---|---|---|---|
| 4,054,827 A | 10/1977 | Reimers | |
| 6,700,802 B2 * | 3/2004 | Ulinski et al. | 363/37 |
| 6,812,587 B2 * | 11/2004 | Gilbreth et al. | 290/52 |
| 6,854,688 B2 | 2/2005 | McElroy et al. | |
| 2007/0196704 A1 | 8/2007 | Valensa | |
| 2007/0262648 A1 | 11/2007 | McKenzie | |
| 2008/0224538 A1 * | 9/2008 | Choi et al. | 307/11 |
| 2008/0280175 A1 | 11/2008 | Gurunathan | |

OTHER PUBLICATIONS

U.S. Appl. No. 11/656,006, filed Jan. 22, 2007, K.R. Sridhar.
U.S. Appl. No. 11/797,708, filed May 7, 2007, Ramesh Srinivasan et al.
U.S. Appl. No. 11/797,707, filed May 7, 2007, Ranganathan Gurunathan et al.
International Search Report and Written Opinion of the International Searching Authority, in PCT Application PCT/US2010/041221, mailed Feb. 25, 2011.
Urciuoli, Damian, "Switching Stage Design and Implementation for an Efficient Three-Phase 5kW PWM DC-DC Converter," Thesis submitted to the Faculty of the Virginia Polytechnic Institute, Aug. 4, 2003, pp. i-79.
Dai, Min et al., "A Three-Phase Four-Wire Inverter Control Technique for a Single Distributed Generation Unit in Island Mode", IEEE Transactions on Power Electronics, vol. 23, No. 1, Jan. 4, 2008, pp. 322-331.

* cited by examiner

*Primary Examiner* — Rexford Barnie
*Assistant Examiner* — Dru Parries
(74) *Attorney, Agent, or Firm* — The Marbury Law Group, PLLC

(57) ABSTRACT

An exemplary method of providing electrical power is provided. A first alternating current is received from a grid. The first alternating current is converted to a first direct current using a first inverter in electrical communication with the grid. The first inverter is also in electrical communication with a fuel cell system. The first direct current is converted to a second alternating current using a second inverter, and the second alternating current is provided to a load.

5 Claims, 6 Drawing Sheets

UNINTERRUPTIBLE FUEL CELL SYSTEM

FIELD

The subject of the disclosure relates generally to a fuel cell system for providing electrical power to a load. More specifically, the embodiments of the present disclosure relate to an uninterruptible fuel cell system in bi-directional electrical communication with a power grid.

BACKGROUND

Electrical power systems can be used to provide electrical power to one more loads such as buildings, appliances, lights, tools, air conditioners, heating units, factory equipment and machinery, power storage units, computers, security systems, etc. The electricity used to power the loads is often received from an electrical grid (or grid). The grid can be any network of electrical transmission lines which are used to transport energy from a first location to a second location. Electricity is generally supplied to the grid by utility companies or other off-site power distribution companies. Unfortunately, presently used power systems are often unable to adequately compensate for grid outages, power disruptions in the grid, and increased load demands. Presently used power systems are also unable to adequately take advantage of decreased load demands.

As an example, a factory may use electricity from the grid to run several large manufacturing machines. If the load in the factory increases due to the need for increased production, the grid may not be able to provide enough power to keep the manufacturing machines operational. Similarly, the factory may not receive adequate power if there is a grid outage or other grid disruption. As an alternative, the factory may use electricity from a local power source instead of the grid. However, in traditional power supply systems the local power source is not able to efficiently interact with the grid to optimize the provision of power to the load. Further, during times of increased load or a local power source outage, the factory may still not have adequate power for the manufacturing machines. Further yet, during times of decreased load, the local power source is not able to efficiently provide excess power to the grid.

SUMMARY

An exemplary method of providing electrical power is provided. A first alternating current is received from a grid. The first alternating current is converted to a first direct current using a first inverter in electrical communication with the grid. The first inverter is also in electrical communication with a fuel cell system. The first direct current is converted to a second alternating current using a second inverter, and the second alternating current is provided to a load.

An exemplary system for providing power is also provided. The system includes a fuel cell system, a bi-directional inverter, a second inverter, and a load. The fuel cell system is configured to provide a first direct current. The bi-directional inverter is in electrical communication with the fuel cell system and a grid. The second inverter is in electrical communication with the fuel cell system and the bi-directional inverter. The second inverter is configured to convert the first direct current to a first alternating current. The load is in electrical communication with the second inverter, and is configured to receive the first alternating current from the second inverter.

Another exemplary system for providing power is provided. The system includes first means for providing a first direct current. The system also includes second means for converting the first direct current into a first alternating current which is supplied to a grid. The second means is in electrical communication with the first means and the grid. The system further includes third means for converting the first direct current into a second alternating current which is supplied to a load. The third means is in electrical communication with the first means and the second means.

Another exemplary system for providing power is also provided. The system includes a fuel cell system, an alternative power source, a common direct current (DC) bus, and a bi-directional inverter. The common DC bus is configured to receive a first DC signal originating from the fuel cell system and a second DC signal originating from the alternative power source. The common DC bus is also configured to provide, to the bi-directional inverter, information regarding a first amount of power available from the fuel cell system and a second amount of power available from the alternative power source. The bi-directional inverter is in electrical communication with a grid. The bi-directional inverter is configured to determine whether power is to be provided to the grid or received from the grid based on the information regarding the first amount of power available from the fuel cell system and the second amount of power available from the alternative power source.

Other features and advantages will become apparent to those skilled in the art upon review of the following drawings, the detailed description, and the appended claims.

BRIEF DESCRIPTION OF THE DRAWINGS

Exemplary embodiments will hereafter be described with reference to the accompanying drawings.

DETAILED DESCRIPTION

Thus, the inventors have perceived a need for an uninterruptible power system which efficiently utilizes both power from the grid and power from a local power supply. Further, the inventors have perceived a need for an uninterruptible power system in which electrical power can be efficiently provided to the grid from a local power source.

Figure 1:
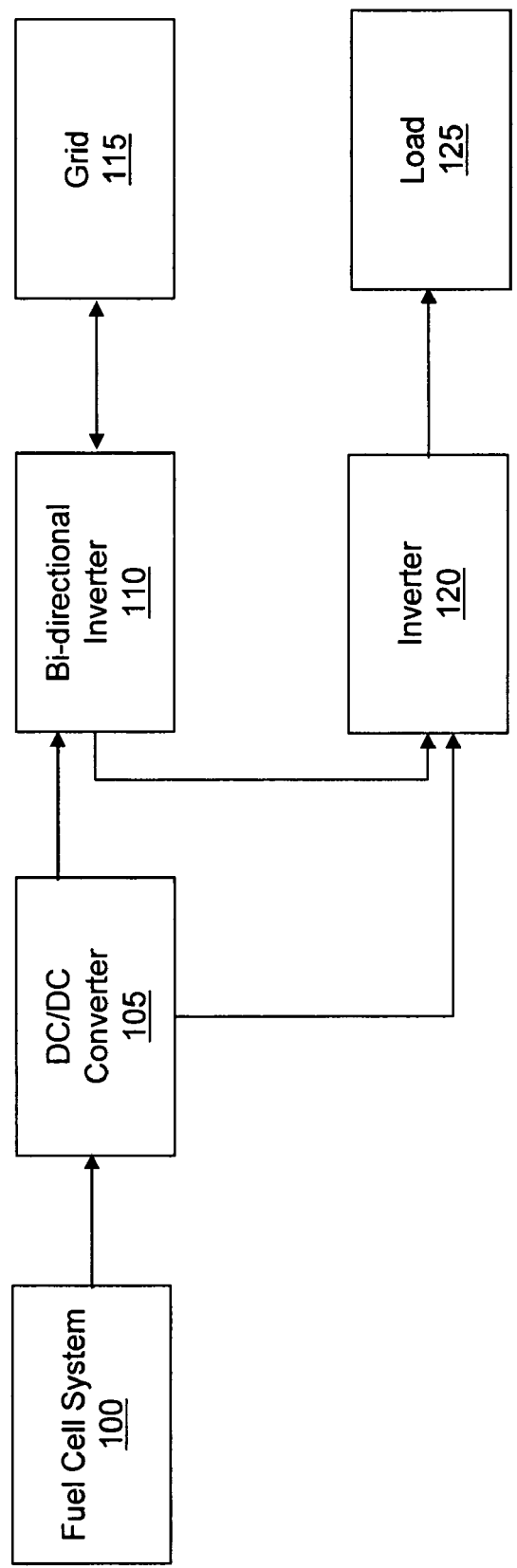
FIG. 1 is a block diagram illustrating an uninterruptible fuel cell power system in accordance with an exemplary embodiment.

FIG. 1 is a block diagram illustrating an uninterruptible fuel cell power system in accordance with an exemplary embodiment. The uninterruptible fuel cell power system (or system) includes a fuel cell system 100. In an exemplary embodiment, fuel cell system 100 can include one or more fuel cell columns, each of which may contain one or more fuel cell stacks, such as solid oxide fuel cell stacks. A fuel cell stack can refer to a plurality of individual fuel cells which are electrically connected in series. The number of individual fuel cells which make up fuel cell system 100 can be based on the amount of electrical power which fuel cell system 100 is intended to generate. In alternative embodiments, fuel cell system 100 can include any other configuration, arrangement, and/or number of individual fuel cells. An exemplary fuel system is described in U.S. patent application Ser. No. 11/797,707 (filed May 7, 2007 and entitled Ripple Cancellation), the disclosure of which is incorporated herein by reference in its entirety.

Fuel cell system 100 can produce a direct current (DC) as known to those of skill in the art. The amount of direct current produced by fuel cell system 100 may be controlled by a system monitor based on load demand and/or power available from a grid 115. The system monitor can be a monitoring and/or control apparatus, such as a computer or other controller, which is configured to monitor and/or control fuel cell system 100, grid 115, and a load 125. A DC/DC converter 105 is in electrical communication with fuel cell system 100 and can be used to increase (i.e., boost) the voltage of the DC signal produced by fuel cell system 100. In an alternative embodiment, DC/DC converter 105 may not be used. An inverter 120 is in electrical communication with DC/DC converter 105. Inverter 120 can be any electrical device configured to receive a direct current and convert the received direct current into an alternating current. Inverter 120 can receive the increased DC signal from DC/DC converter 105. Inverter 120 can also convert the received DC signal into an alternating current (AC) signal as known to those of skill in the art. The AC signal is provided to load 125 which is in electrical communication with inverter 120. As used herein, electrical communication can refer to any direct or indirect electrical connection. Load 125 can be any type of unit(s) which consume electrical power. In an alternative embodiment, load 125 may be a DC load and inverter 120 may not be used.

In an exemplary embodiment, load 125 can also receive electrical power from grid 115. Grid 115 can be any network of electrical transmission lines which are used to transport electricity. The electricity in grid 115 can be produced by a utility company or any other power producing entity. In an exemplary embodiment, grid 115 can be an AC grid. However, in alternative embodiments, grid 115 may be a DC grid. Grid 115 is in electrical communication with a bi-directional inverter 110 such that an AC signal from grid 115 can be converted to a DC signal. Bi-directional inverter can be any electronic device configured to receive an alternating current from a first source and convert the received alternating current into a direct current, and receive a direct current from a second source and convert the received direct current into an alternating current. The DC signal can be conveyed from bi-directional inverter 110 to inverter 120 where it is converted into an AC signal. The AC signal can be provided from inverter 120 to load 125. Use of both bi-directional inverter 110 and inverter 120 allows the electrical power received from grid 115 to be well regulated. Use of the bi-directional inverter 110 and inverter 120 also allows load 125 to be well isolated from grid 115. In an exemplary embodiment, bi-directional inverter 110 can also receive a DC signal from DC/DC converter 105 and convert the received DC signal to an AC signal. The AC signal can be provided from bi-directional inverter 110 to grid 115. In an alternative embodiment, bi-directional inverter 110 may be replaced by one or more uni-directional inverters.

In an exemplary embodiment, power to load 125 can be provided by fuel cell system 100 during normal operation. If a power condition occurs, additional power can be provided to load 125 by grid 115. The power condition may occur if the demand of load 125 increases beyond the capacity of fuel cell system 100. The demand of load 125 may increase on hot days in which air conditioning is used, on cold days in which heaters are used, during peak times of production when additional machines are being run, etc. The power condition may also occur if fuel cell system 100 malfunctions or is otherwise unable to provide adequate power to load 125. In an exemplary embodiment, the power condition can be detected and accounted for by the system monitor. Alternatively, the power condition may be detected and/or corrected using any other method known to those of skill in the art. If the demand of load 125 decreases, additional power created by fuel cell system 100 can be provided to grid 115. Fuel cell system 100 can also provide power to grid 115 during a normal operating condition or if load 125 is not drawing any power. As such, a user of the system may be eligible for a credit, rebate, discount, or other incentive from the owner of grid 115. In an alternative embodiment, power to load 125 may be provided by grid 115 during normal operation. In such an embodiment, if the demand of load 125 increases beyond the capacity of grid 115 or if any other power condition occurs, fuel cell system 100 can be used to provide additional power to load 125.

Figure 2:
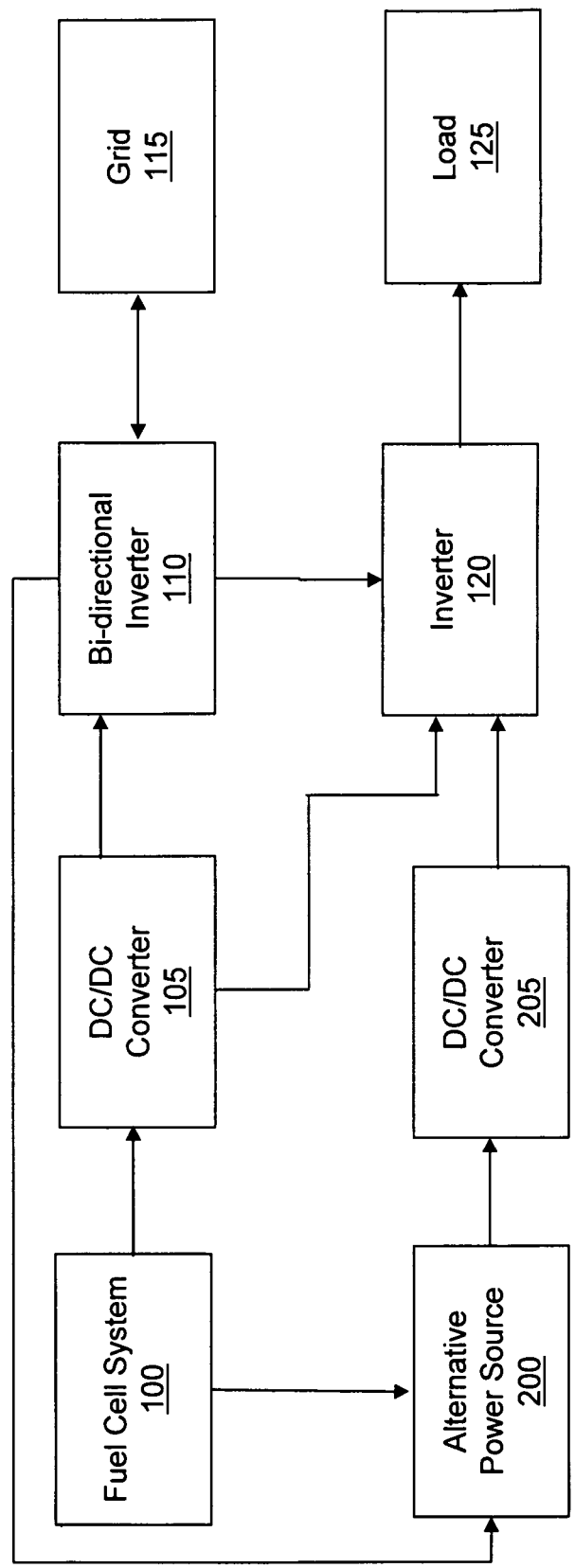
FIG. 2 is a block diagram illustrating the uninterruptible fuel cell power system of FIG. 1 with an alternative power source in accordance with an exemplary embodiment.

FIG. 2 is a block diagram illustrating the uninterruptible fuel cell power system of FIG. 1 with an alternative power source 200 in accordance with an exemplary embodiment. Alternative power source 200 can be a battery, a wind turbine, a solar cell system, a generator, a second fuel cell system, or any other device capable of storing and/or producing electrical power. In an exemplary embodiment, alternative power source 200 is a DC power source. Alternatively, alternative power source 200 may be an AC source. Alternative power source 200 can produce a direct current. The DC signal from alternative power source 200 can be provided to a DC/DC converter 205 such that the voltage of the DC signal is increased. The DC signal with increased voltage can be provided to inverter 120 such that an AC signal is produced. The AC signal can be provided to load 125 from inverter 120.

In an exemplary embodiment, alternative power source 200 can be charged with power from fuel cell system 100 and/or grid 115 during normal operation. For example, alternative power source 200 can be a battery configured to store an electrical charge. During normal operation, the battery can receive power from fuel cell system 100 such that the charge is maintained. Alternatively, the battery can receive power from grid 115 through bi-directional inverter 110. If load 125 increases, fuel cell system 100 malfunctions, grid 115 malfunctions, and/or any other power condition occurs, the battery can be used to provide power to load 125. When a normal operating condition is again reached, the battery can be recharged to ensure that the battery is ready to respond to any subsequent power conditions. Alternatively, alternative power source 200 may be a generator or other power generating device which does not receive any power from fuel cell system 100 or grid 115. In an exemplary embodiment, alternative power source 200 can be controlled by the system monitor. For example, the system monitor may detect a power condition in which fuel cell system 100 and grid 115 are unable to provide adequate power to load 125. In response, the system monitor can activate alternative power source 200 such that load 125 has adequate power. Upon resolution of the power condition (i.e., when fuel cell system 100 and/or grid 115 are able to power load 125), the system monitor can deactivate alternative power source 200. In one embodiment, the power supplied to load 125 and/or grid 115 may be managed by cooperation between fuel cell system 100 and alternative power source 200. As an example, alternative power source 200 may be a solar cell system. During times of peak sunlight, load 125 and/or grid 115 can be powered by the solar cell system, and the power drawn from fuel cell system 100 can be minimized. Using fuel cell system 100 and alternative power source 200 in combination can result in lower cost, less pollution, less wear and tear on individual components, etc.

Figure 3:
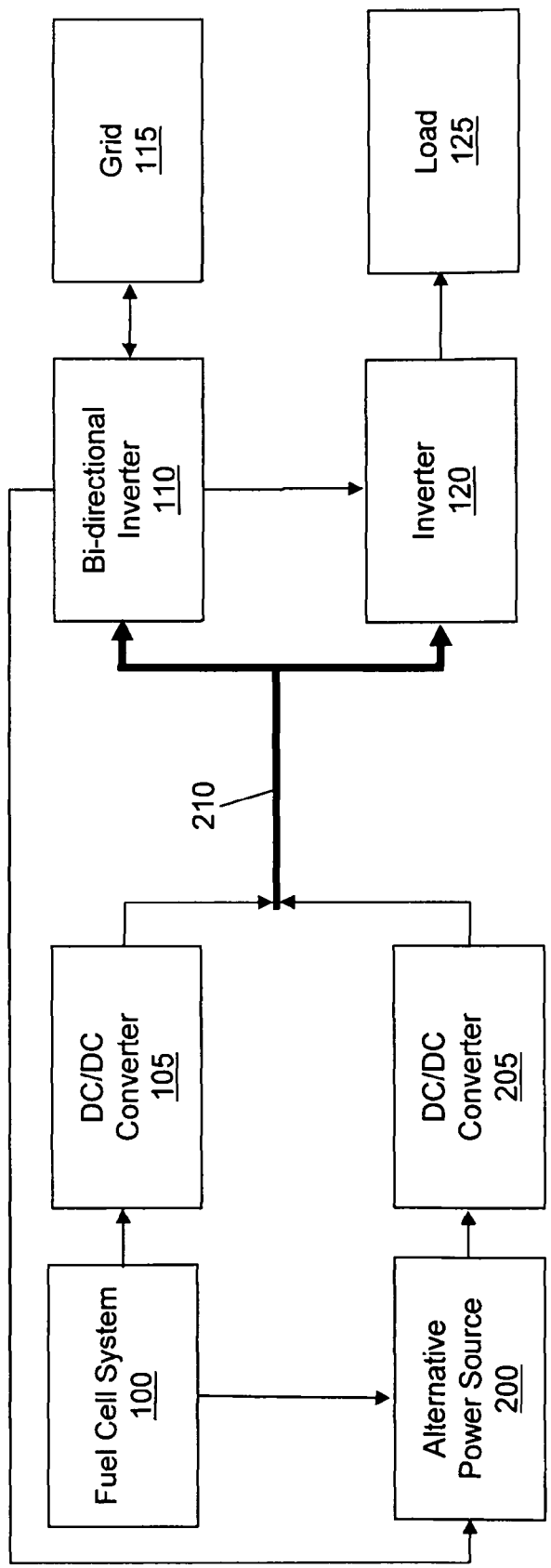
FIG. 3 is a block diagram illustrating the uninterruptible fuel cell power system of FIG. 1 with a common DC bus in accordance with an exemplary embodiment.

FIG. 3 is a block diagram illustrating the uninterruptible fuel cell power system of FIG. 1 with a common DC bus 210 in accordance with an exemplary embodiment. As described above, DC/DC converter 105 can be used to convert a DC signal received from fuel cell system 100, and DC/DC converter 205 can be used to convert a DC signal received from alternative power source 200. In the embodiment of FIG. 3, a first DC signal from DC/DC converter 105 and a second DC signal from DC/DC converter 205 can both be provided to a common DC bus 210. As such, common DC bus 210 can have information regarding an amount of power available from fuel cell system 100 and an amount of power available from alternative power source 200. Common DC bus 210 is also in electrical communication with bi-directional inverter 110 and inverter 120 such that the first DC signal and the second DC signal can be conveyed to bi-directional inverter 110 and/or inverter 120. In an exemplary embodiment, bi-directional inverter 110 can also use common DC bus 210 to identify the power available from fuel cell system 100 and/or alternative power source 200. Bi-directional inverter 110 can use this information to control an amount of power provided to grid 115 and/or an amount of power received from grid 115. In other respects, the uninterruptible fuel cell power system of FIG. 3 can operate similar to the embodiments described with reference to FIGS. 1 and 2.

Figure 4A:
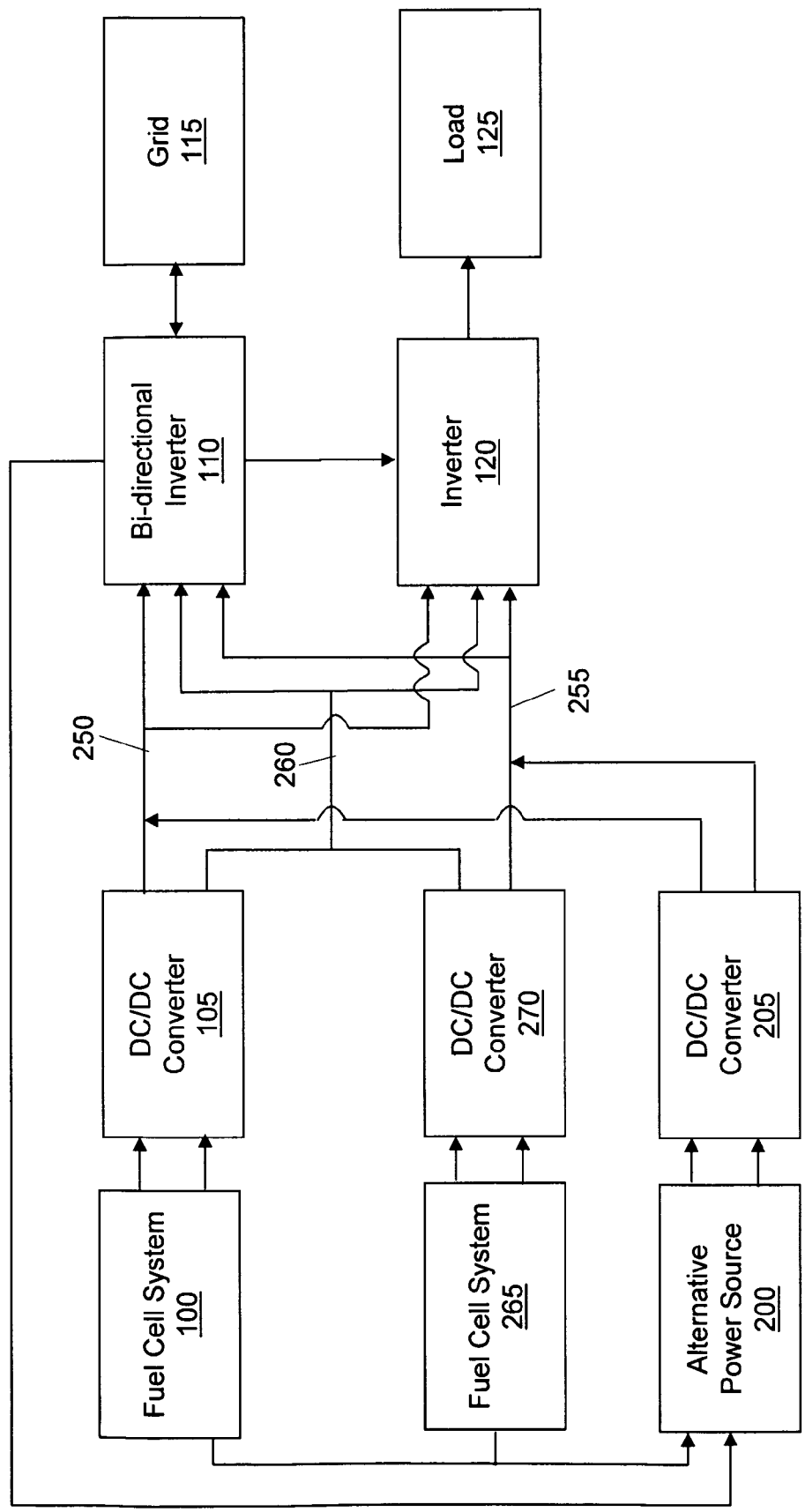
FIG. 4A is a block diagram illustrating an uninterruptible fuel cell power system with a first split bus configuration in accordance with an exemplary embodiment.
Figure 4B:
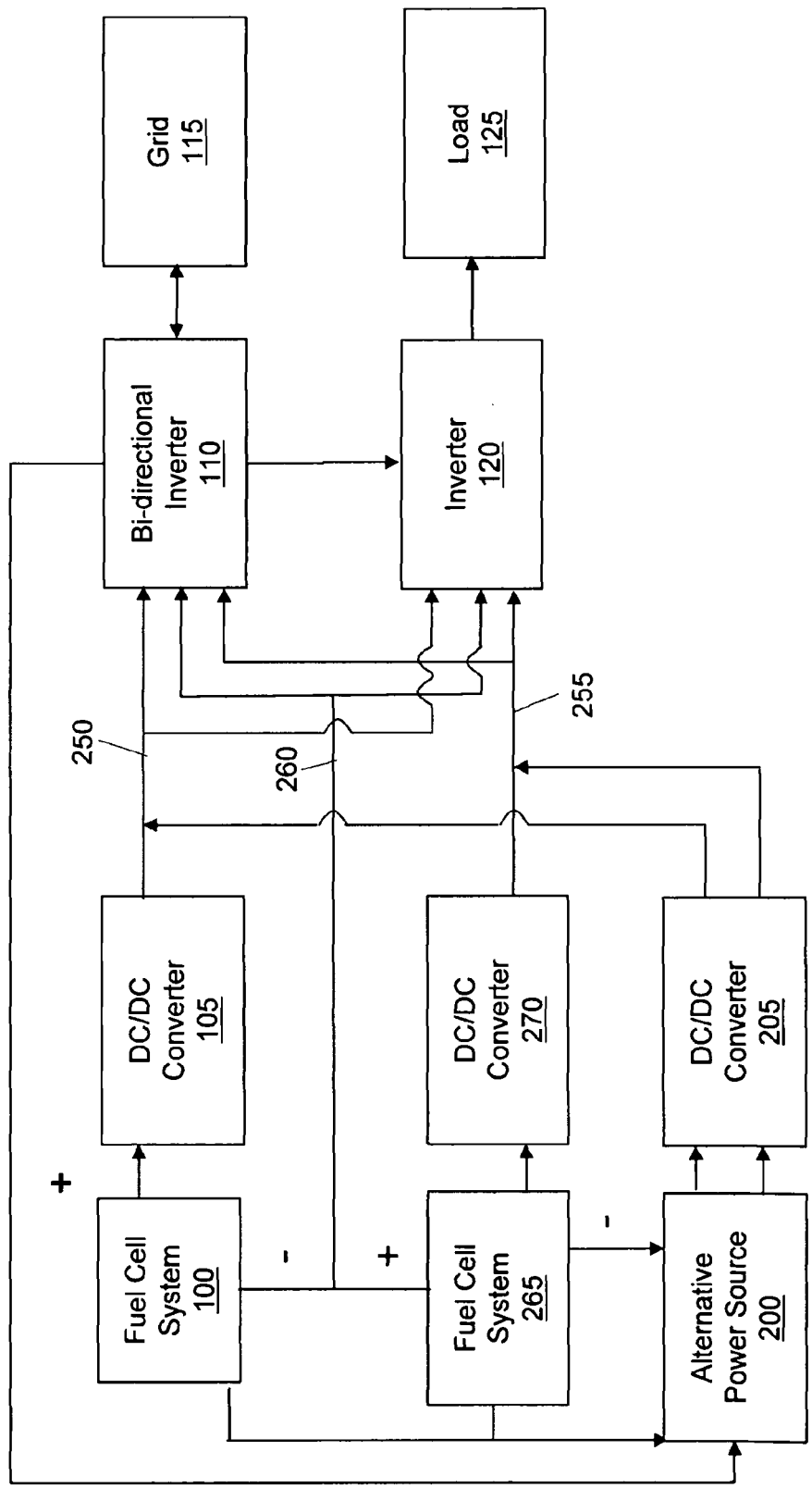
FIG. 4B is a block diagram illustrating an uninterruptible power system with a second split bus configuration in accordance with an exemplary embodiment.

FIGS. 4A and 4B are block diagrams illustrating an uninterruptible fuel cell power system with first and second split bus configurations in accordance with exemplary embodiments. An exemplary split bus system is described in U.S. patent application Ser. No. 11/797,707 filed on May 7, 2007 and incorporated herein by reference in its entirety. The systems include fuel cell system 100 described above and a fuel cell system 265. Each of fuel cell systems 100 and 265 can be one or more stacks, one or more columns, or any other configuration(s) of fuel cells. The systems also include a split bus configured to receive DC signals from fuel cell system 100 and fuel cell system 265. In alternative embodiments, additional fuel cell systems may be used to provide DC signals to the split bus and/or different split bus configurations may be used. The split bus includes a positive bus 250, a negative bus 255, and a neutral bus 260.

In FIG. 4A, positive bus 250 receives a DC signal from a first output of DC/DC converter 105. In alternative embodiments, positive bus 250 may receive DC signals originating from a plurality of fuel cell systems and/or alternative power sources. Neutral bus 260 receives signals from a second output of DC/DC converter 105 and a first output of DC/DC converter 270. In alternative embodiments, neutral bus 260 may be in electrical communication with additional fuel cell systems and/or a plurality of alternative power sources. Negative bus 255 receives a DC signal from a second output of DC/DC converter 270. In an alternative embodiment, negative bus 255 may receive DC signals from a plurality of fuel cell systems and/or a plurality of alternative power sources. In FIG. 4B, positive bus 250 receives a DC signal from the output of DC/DC converter 105, neutral bus 260 receives signals from opposite polarity outputs of fuel cell systems 100 and 265, and negative bus 255 receives a DC signal from the output of DC/DC converter 270. In both embodiments, positive bus 250 also receives a DC signal from a first output of DC/DC converter 205, which is in electrical communication with alternative power source 200. Similarly, negative bus 255 also receives a DC signal from a second output of DC/DC converter 205. As illustrated in FIGS. 4A and 4B, positive bus 250, negative bus 255, and neutral bus 260 are in electrical communication with both bi-directional inverter 110 and inverter 120. In other respects, the uninterruptible fuel cell power system of FIGS. 4A and 4B can operate similar to the embodiments described with reference to FIGS. 1 and 2.

Figure 5:
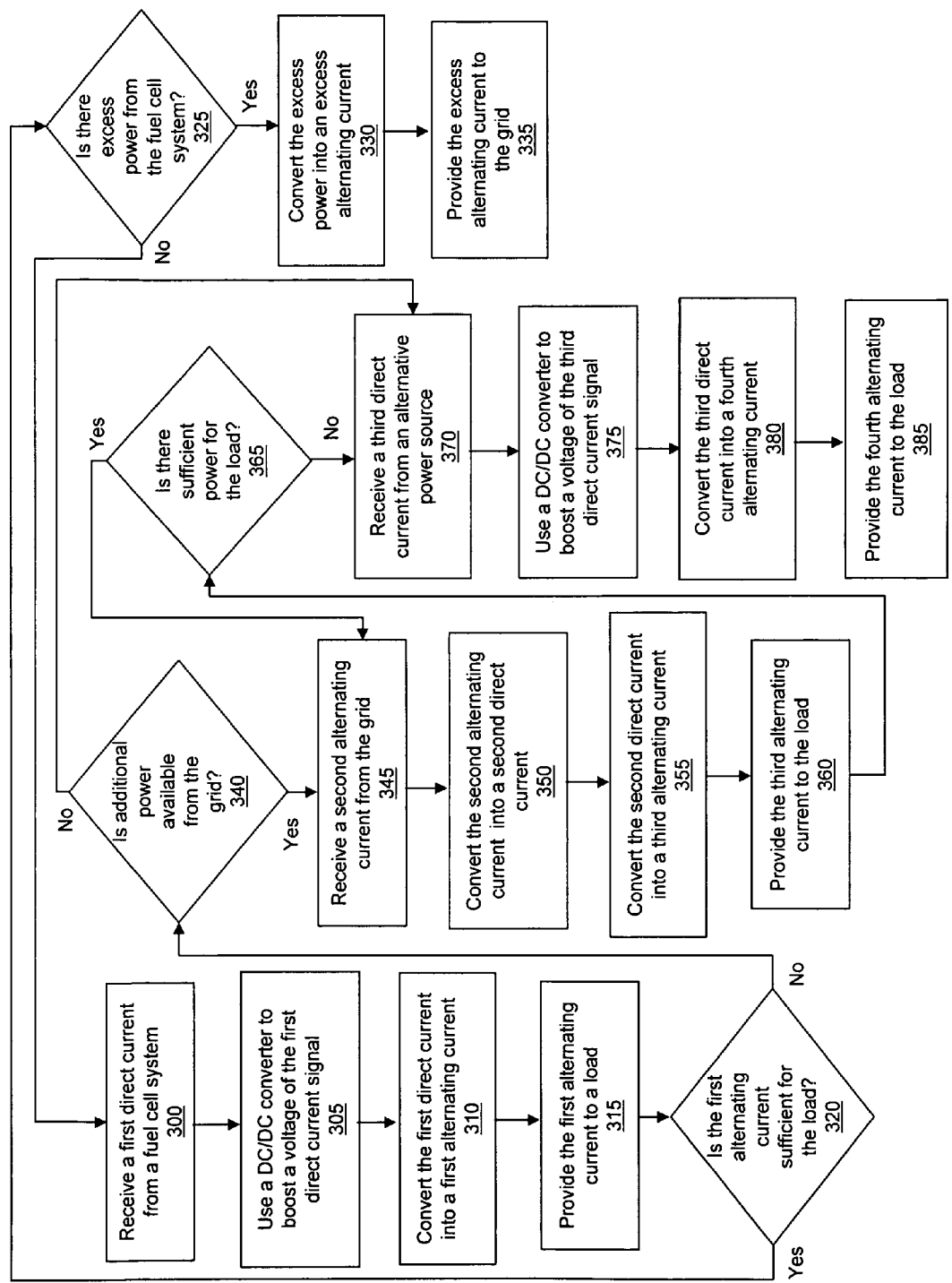
FIG. 5 is a flow diagram illustrating operations performed by an uninterruptible fuel cell power system in accordance with an exemplary embodiment.

FIG. 5 is a flow diagram illustrating operations performed by an uninterruptible fuel cell power system in accordance with an exemplary embodiment. In alternative embodiments, additional, fewer, or different operations may be performed. In an operation 300, a first direct current is received from a fuel cell system. The fuel cell system may be fuel cell system 100 described with reference to FIGS. 1 and 2. In an operation 305, a DC/DC converter is used to boost a voltage of the first direct current signal. In alternative embodiments, the DC/DC converter may not be used. In an operation 310, the first direct current is converted into a first alternating current. The first direct current can be converted using inverter 120 described with reference to FIGS. 1 and 2. Alternatively, any other device capable of converting a direct current into an alternating current may be used. In an operation 315, the first alternating current is provided to a load. In an alternative embodiment, the load may be a DC load, and the first direct current may not be converted to the first alternating current.

In an operation 320, a determination is made regarding whether the first alternating current is sufficient to power the load. Increases in load demand and/or decreases in output by the fuel cell system may result in the first alternating current being insufficient to support the load. In an exemplary embodiment, the system monitor can be used to determine whether the first alternating current is sufficient for the load. The system monitor can monitor current, voltage, power, and/or any other electrical phenomenon which can be used to determine whether the load is being provided an adequate amount of power. The system monitor can be implemented by any method known to those of skill in the art.

If it is determined that the first alternating current is sufficient for the load, the system can determine whether there is excess power being generated by the fuel cell system in an operation 325. If there is not excess power being generated by the fuel cell system, the system can continue to provide power to the load in operations 300, 305, 310, and 315. If there is excess power generated by the fuel cell system, the system converts the excess power into an excess alternating current in an operation 330. In an exemplary embodiment, the excess power can be converted into the excess alternating current by bi-directional inverter 110 described with reference to FIGS. 1 and 2. Alternatively, a regular (i.e., unidirectional) inverter may be used. In an operation 335, the excess alternating current is provided to the grid.

In an alternative embodiment, excess power from the fuel cell system may not be provided to the grid. In such an embodiment, if there is excess power from the fuel cell system, the fuel cell system can be adjusted such that the power output is reduced. As a result, the fuel cell system may produce only enough power to sustain the load. In one embodiment, power output of the fuel cell system can be adjusted by connecting or disconnecting fuel cell stacks to/from the fuel cell system. Alternatively, the power output of the fuel cell system may be adjusted by connecting or disconnecting individual fuel cells to/from the fuel cell system. Adjustment of the amount of power provided by the fuel cell system can be controlled by the system monitor. In another alternative embodiment, excess power may be provided to the grid only during times of peak demand for electricity.

If it is determined that the first alternating current is not sufficient for the load, the system can determine whether additional power is available from the grid in an operation 340. If additional power is available from the grid, the system receives a second alternating current from the grid in an operation 345. In an operation 350, the second alternating current is converted into a second direct current. The second alternating current may be converted using bi-directional inverter 110 described with reference to FIGS. 1 and 2. Alternatively, any other type of inverter may be used. In an operation 355, the system converts the second direct current into a third alternating current. The second direct current can be converted by inverter 120 described with reference to FIGS. 1 and 2. In an operation 360, the third alternating current is provided to the load. In an alternative embodiment, if the load is a DC load, the second direct current may be provided directly to the load.

In an operation 365, a determination is made regarding whether there is sufficient power for the load. In an exemplary embodiment, the determination can be made by the system monitor. If it is determined that sufficient power is being provided to the load by the fuel cell system and the grid, the system can continue to provide power from the grid in operations 345, 350, 355, and 360. Alternatively, if it is determined at any time in operation 320 that the first alternating current is sufficient for the load, the system may stop receiving the second alternating current from the grid. If it is determined in operation 365 that the load is not receiving sufficient power, a third direct current is received from an alternative power source in an operation 370. The third direct current from the alternative power source is also received if the system determines in operation 340 that there is not additional power available from the grid. In an exemplary embodiment, the alternative power source can be alternative power source 200 described with reference to FIG. 2.

In an operation 375, the system uses a DC/DC converter to boost a voltage of the third direct current signal. In an alternative embodiment, the DC/DC converter may not be used. In an operation 380, the system converts the third direct current into a fourth alternating current. In an exemplary embodiment, the third direct current can be converted using inverter 120 described with reference to FIGS. 1 and 2. In an operation 385, the fourth alternating current is provided to the load. Alternatively, if the load is a DC load, the third direct current may be provided directly to the load without being converted into the fourth alternating current. In an exemplary embodiment, the system monitor can be configured to determine when power from the fuel cell system, the grid, and/or the alternative power source should be increased, decreased, or eliminated based on the demand of the load.

As described with reference to FIG. 5, the fuel cell system is the main power source for the load. During a power condition, power from the fuel cell is supplemented with power from the grid and/or the alternative power source such that the load remains adequately supported. However, it is to be understood that the embodiments described herein are not limited to such a configuration. In an alternative embodiment, the grid may be the main power source for the load and the fuel cell system and the alternative power source can be used to supplement the power from the grid.

One or more flow diagrams have been used to describe exemplary embodiments. The use of flow diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A system for providing power, the system comprising:
   a fuel cell system configured to provide a first direct current, wherein the first direct current is provided to a second inverter on a split bus having a positive bus, a negative bus, and a neutral bus;
   a system monitor configured to detect a power condition in which a load does not receive sufficient power from the fuel cell system by monitoring at least one of the fuel cell system and the load;
   a first inverter in electrical communication with the fuel cell system and a grid, wherein the first inverter is configured to receive at least a portion of the first direct current from the fuel cell system, convert the received portion of the first direct current to a second alternating current, and provide the second alternating current to the grid and to terminate providing the second alternating current to the grid in response to detection by the system monitor of the power condition;
   the second inverter in electrical communication with the fuel cell system wherein the second inverter is configured to convert the first direct current to a first alternating current;
   the load in electrical communication with the second inverter, wherein the load is configured to receive the first alternating current from the second inverter; and
   an alternative power source configured to provide a third direct current to the second inverter through the split bus;
   wherein the system monitor is configured to control the first alternating current and the second alternating current to provide power to the load.

2. The system of claim 1, further comprising a DC/DC converter configured to boost the first direct current.

3. The system of claim 1, wherein the first inverter is a bi-directional inverter in electrical communication with the second inverter and wherein the first inverter is configured to:
   receive a third alternating current from the grid in response to detection by the system monitor of the power condition;
   convert the third alternating current to a second direct current; and
   provide the second direct current to the second inverter.

4. The system of claim 3, wherein the second inverter is further configured to:
   convert the second direct current to a third fourth alternating current; and
   provide the fourth alternating current to the load.

5. The system of claim 3, wherein the power condition comprises at least one of a fuel cell system failure in which at least a portion of the first direct current from the fuel cell system is not received or an increase in power demand of the load beyond a capacity of the fuel cell system.

* * * * *